UNITED STATES PATENT OFFICE.

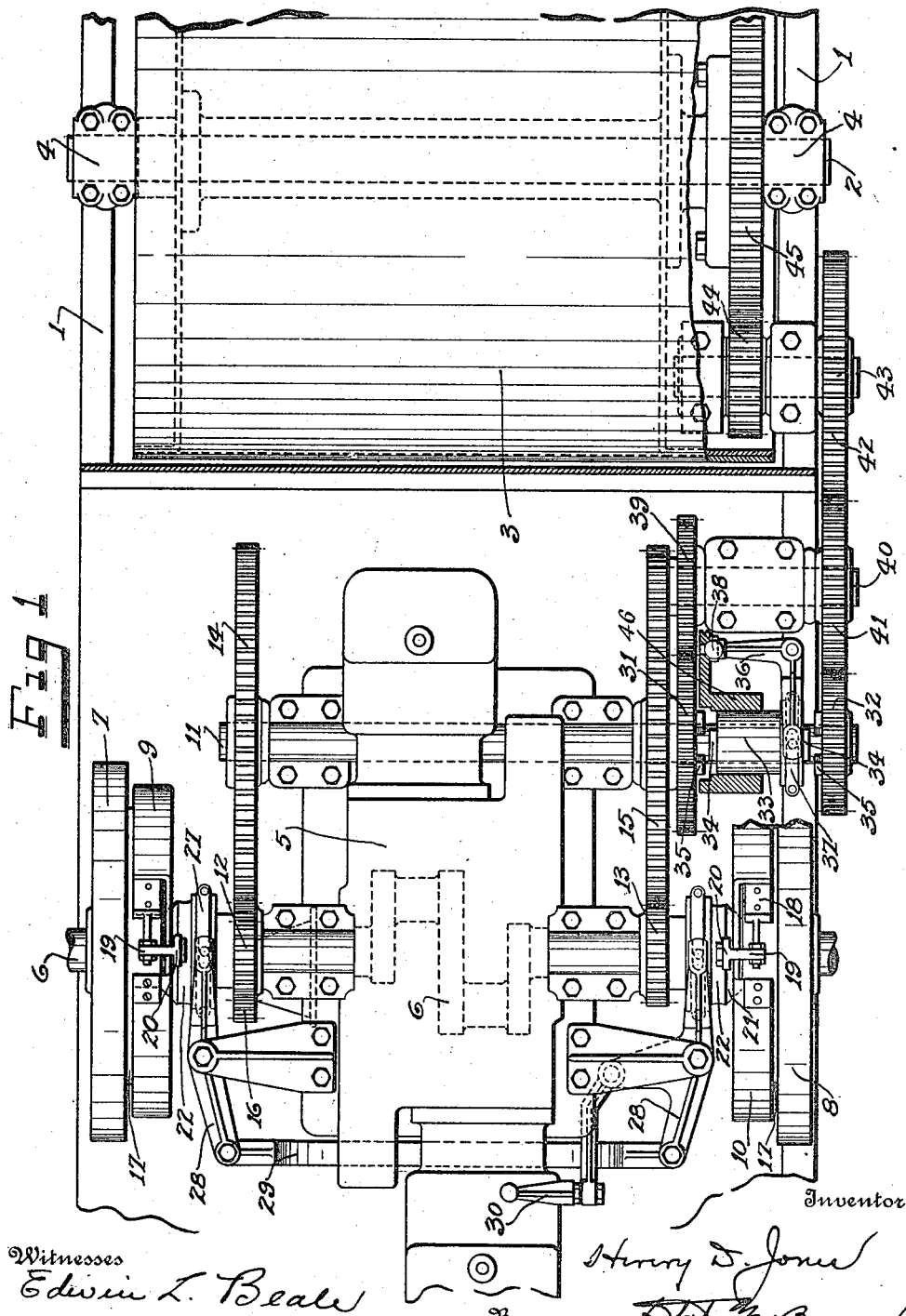

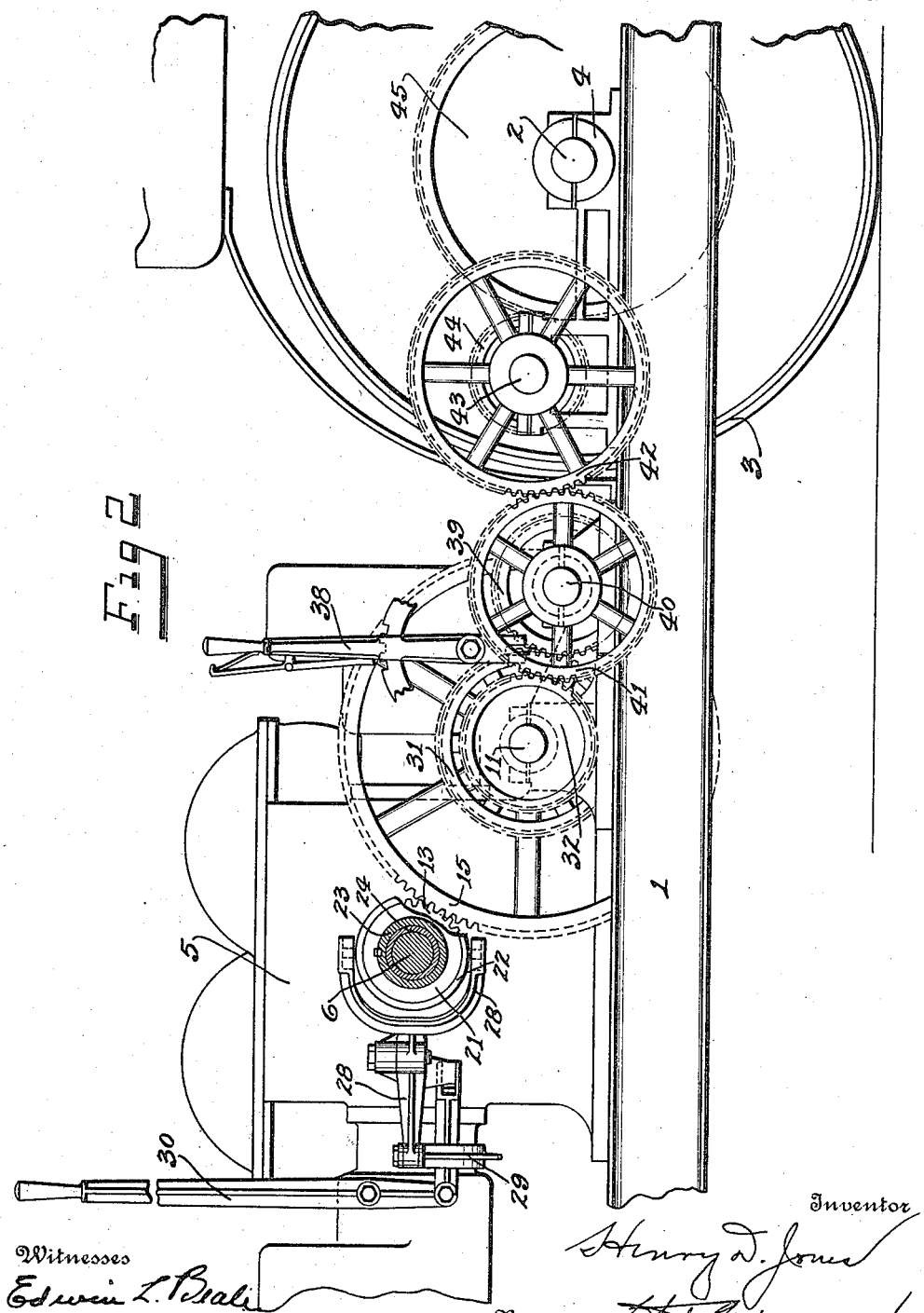

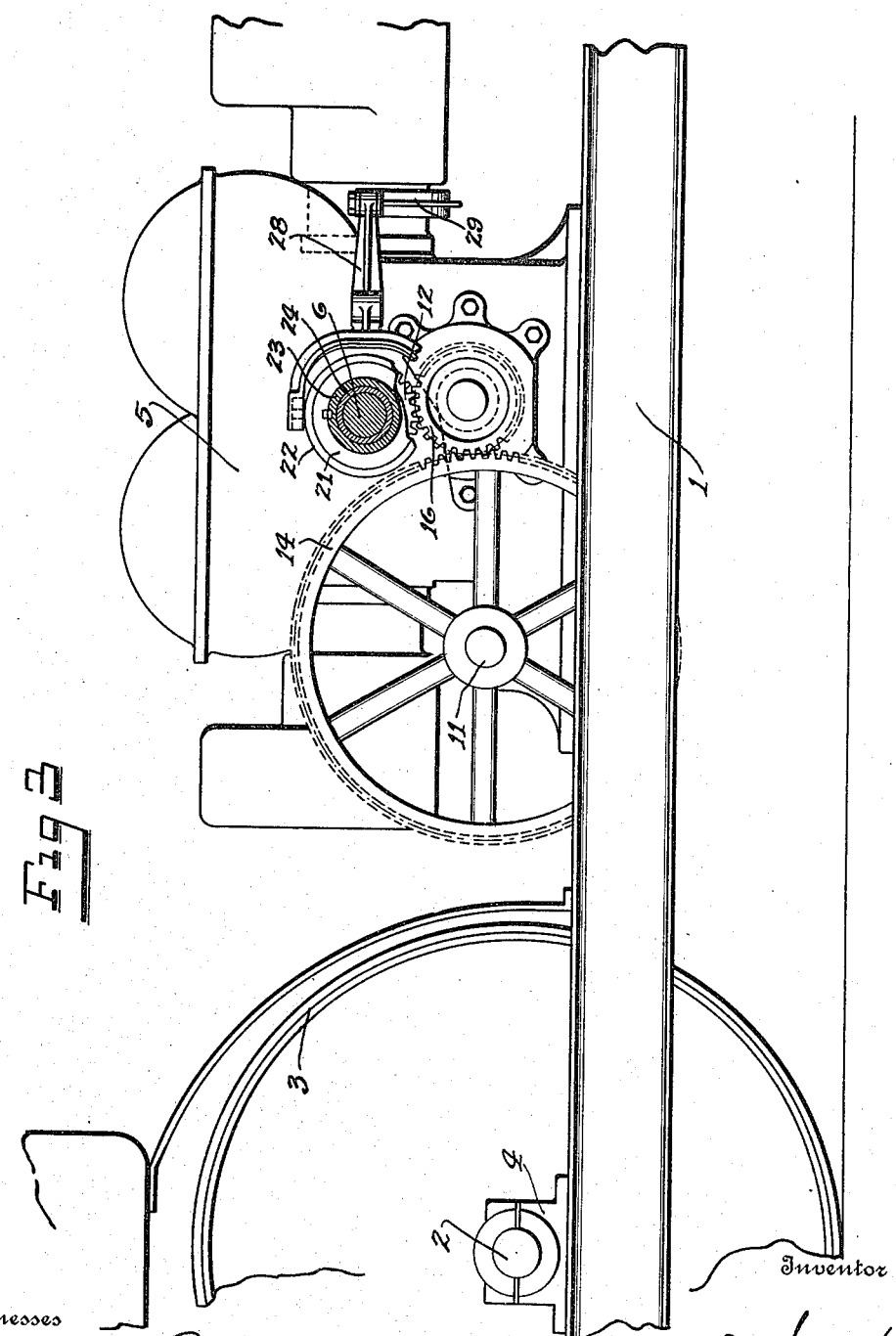

HENRY D. JONES, OF SPRINGFIELD, OHIO, ASSIGNOR TO THE KELLY-SPRINGFIELD ROAD ROLLER COMPANY, OF SPRINGFIELD, OHIO, A CORPORATION OF OHIO.

DRIVING MECHANISM.

1,170,644.  Specification of Letters Patent.  Patented Feb. 8, 1916.

Application filed July 16, 1915. Serial No. 40,229.

*To all whom it may concern:*

Be it known that I, HENRY D. JONES, a citizen of the United States, residing at Springfield, in the county of Clark and State of Ohio, have invented certain new and useful Improvements in Driving Mechanism, of which the following is a specification.

This invention relates to improvements in driving mechanism particularly adapted for such machines as road rollers, which have an internal combustion engine as the motive power.

An object of the invention is to provide means whereby different speeds may be secured in both the forward and reverse direction of travel of the machine.

A further object of the invention is to provide a driving mechanism which will be simple in construction and effective in operation.

A further object of the invention is to provide such an arrangement of the driving parts as to enable the elimination of beveled gears and the employment of spur gears entirely for the purpose of transmitting motion from one shaft to the other.

In the accompanying drawings:—Figure 1 is a top plan view of so much of a road roller as is necessary to illustrate my improvements. Fig. 2 is a side elevation of the same. Fig. 3 is a view of the opposite side of the same.

In the said drawings, 1 represents the frame, to the forward portion of which is swiveled the front roller (not shown), the rear of said frame being supported upon the axle 2 of the rear roller 3, the axle being journaled in suitable bearings 4 and arranged to be driven in the manner hereinafter explained. The motive power in the present case is an internal combustion engine 5, the crank shaft thereof being represented by the numeral 6. This crank shaft extends transversely across the machine and has journaled at each end thereof fly wheels 7 and 8 which form respectively the driving members of clutches, the driven members 9 and 10 of which are connected with the transversely arranged shaft 11 through the medium of the pinions 12 and 13, connected respectively with the driven members 9 and 10, and the gears 14 and 15 connected respectively with the said shaft 11, an intermediate gear 16, however, being interposed between the pinion 12 and the gear 14, as shown in Fig. 3 to secure a reverse direction of rotation of the shaft 11 from that imparted by the pinion 13. The clutches are constructed in all respects alike and have been more fully described in an application which I am filing herewith, but may be briefly here explained as follows:—Each of the fly wheels 7 and 8 has a laterally extending depressed rim 17 encircling which is a friction band 18, one end of which is connected to the driven member and the other end to a lateral extension 19 of a bell crank lever 20 pivotally connected with the driven member and having one arm thereof lying in proximity to the beveled surface 21 of a sleeve 22 slidably mounted upon the extended hub 23 of the driven member but splined thereto so as to rotate therewith. The extended hub 23 of the driven member is loosely mounted upon the bushing 24 on the crank shaft 6. A ring 27 fitting in a grooved portion of the sleeve 22 and connected by a pivoted yoke 28 with a link 29 having a lever 30 connected therewith forms the means for shifting the sleeve 22 causing the beveled surfaces thereof to operate the lever 20 to tighten the band 18. The link 29 is connected with both of the yokes 28 so that when one clutch is thrown in the other is thrown out.

The shaft 11 has loosely mounted thereon gears 31 and 32 and has splined thereto between said gears a shiftable clutch member 33, each end of which is provided with clutch faces 34 to engage clutch faces 35 on the respective gears. A bell crank lever 36, one of the forked arms of which is pivotally connected with ring 37, loosely mounted in a grooved portion of the member 33 and the other end of which is pivotally connected with a lever 38, forms the means for shifting the clutch member 33. The gear 31, which is the larger of the two, meshes with a smaller gear 39 fixed on a shaft 40, and the gear 32 meshes with a gear 41 fixed on said shaft 40, said gear 31 being larger than the gear 32. The gear 41 meshes with a gear 42 fixed on a shaft 43 which has connected therewith a pinion 44 in mesh with a gear 45 connected with the axle 2.

The shiftable clutch member 33 is mounted in a bearing 46 supported by the main frame and this clutch member in turn supports the shaft 11, this construction furnishing a simple arrangement of parts and at the same time a strong and rigid support for the same. The result of this construction is that by shifting the clutches the shaft 11 may be driven in either direction, the proportion of the gearing being such that either clutch will drive said shaft 11 at the same speed in proportion to the speed of the engine. The shaft 11 will drive the axle 2 either through the gears 31 and 39 or through the gears 32 and 41 depending on the position of the clutch member 33, thus furnishing a change of speed in both the forward or rearward travel of the machine.

It will be seen that by the construction and arrangement of parts I am enabled to eliminate the use of beveled gears for transmitting motion and employ exclusively spur gears for the purpose with the consequent advantages in construction and operation.

Having thus described my invention, I claim—

1. In a road roller, the combination of a gas engine crank shaft, a driven shaft, means for driving said driven shaft in either direction from said crank shaft, two spur gears of different size located loosely on said driven shaft, a shiftable clutch between said gears splined to said driven shaft, a third shaft, spur gears thereon in mesh with said driven shaft gears, an axle, and gearing for transmitting the motion of said third shaft to the said axle.

2. In a road roller, the combination of a gas engine crank shaft, a driven shaft, means for driving said driven shaft in either direction from said crank shaft, a stationary bearing, a slidable clutch sleeve splined to said driven shaft and journaled in said bearing, a spur gear on each side of said clutch sleeve loose on said driven shaft, said gears being of different size, an axle, and gearing for transmitting the motion of either one of said loose gears to said axle.

In testimony whereof, I have hereunto set my hand this 12th day of July, 1915.

HENRY D. JONES.

Witness:
CHAS. I. WELCH,

Copies of this patent may be obtained for five cents each, by addressing the "Commissioner of Patents, Washington, D. C."